(12) United States Patent
Hyun

(10) Patent No.: US 9,408,377 B2
(45) Date of Patent: Aug. 9, 2016

(54) FISHING REEL HAVING DRAG ASSEMBLY

(71) Applicant: DOYO ENGINEERING CO., LTD, Bucheon (KR)

(72) Inventor: Kang-Ho Hyun, Bucheon (KR)

(73) Assignee: DOYO ENGINEERING CO., LTD. (KR)

( * ) Notice: Subject to any disclaimer, the term of this patent is extended or adjusted under 35 U.S.C. 154(b) by 0 days.

(21) Appl. No.: 14/601,530

(22) Filed: Jan. 21, 2015

(65) Prior Publication Data
US 2015/0208632 A1 Jul. 30, 2015

(30) Foreign Application Priority Data
Jan. 28, 2014 (KR) ........................ 10-2014-0010480

(51) Int. Cl.
*A01K 89/01* (2006.01)
*A01K 89/033* (2006.01)

(52) U.S. Cl.
CPC ............. *A01K 89/033* (2013.01); *A01K 89/053* (2015.05)

(58) Field of Classification Search
CPC ... A01K 89/015; A01K 89/033; A01K 89/05; A01K 89/057; A01K 89/058
See application file for complete search history.

(56) References Cited

U.S. PATENT DOCUMENTS

| | | | | |
|---|---|---|---|---|
| 2,569,006 A * | 9/1951 | King | ................ | A01K 89/015 192/70.23 |
| 2,760,357 A * | 8/1956 | Burns | ................ | A01K 89/015 242/260 |
| 4,482,105 A * | 11/1984 | Noda | ................ | A01K 89/015 242/268 |
| 4,585,188 A * | 4/1986 | Sato | ................ | A01K 89/01555 242/261 |
| 4,648,566 A * | 3/1987 | Furomoto | ............ | A01K 89/015 192/48.5 |
| 5,996,918 A * | 12/1999 | Nanbu | ................ | A01K 89/033 242/267 |
| 6,047,913 A * | 4/2000 | Yamaguchi | .......... | A01K 89/015 242/310 |
| 2001/0038052 A1* | 11/2001 | Oishi | ................ | A01K 89/015 242/255 |
| 2012/0018562 A1* | 1/2012 | Takamatsu | ........... | A01K 89/015 242/307 |
| 2013/0181081 A1* | 7/2013 | Niitsuma | ........... | A01K 89/0155 242/289 |
| 2013/0200194 A1* | 8/2013 | Lawson | ............... | A01K 89/033 242/268 |
| 2013/0220050 A1* | 8/2013 | Koike | .................... | A01K 89/00 74/439 |
| 2015/0129701 A1* | 5/2015 | Takechi | ............... | A01K 89/033 242/268 |

FOREIGN PATENT DOCUMENTS

KR 1020110101379 9/2011

* cited by examiner

*Primary Examiner* — Emmanuel M Marcelo
(74) *Attorney, Agent, or Firm* — Cantor Colburn LLP

(57) ABSTRACT

A fishing reel having a drag assembly. The drag assembly brakes the unwinding rotation of a spool to prevent a fishing line from being excessively rapidly unwound from the spool and thus from being snapped when the fishing line is drawn out by a hooked fish. The drag assembly includes a washer retainer coupled to a drive gear, and a washer group having a brake washer. Therefore, there is no need for the drive gear to have a shape corresponding to the washer group, whereby the manufacturing process can be facilitated, the time it takes to manufacture the fishing reel can be reduced, and the production cost can also be reduced.

2 Claims, 6 Drawing Sheets

FISHING REEL HAVING DRAG ASSEMBLY

BACKGROUND OF THE INVENTION

1. Field of the Invention

The present invention generally relates to fishing reels having drag assemblies. More particularly, the present invention relates to a fishing reel having a drag assembly that brakes an unwinding rotation of a spool to prevent a fishing line from being excessively rapidly unwound from the spool and snapping when a hooked fish draws out the line. The fishing reel includes a washer retainer coupled to a drive gear, and a washer group having a brake washer, so that there is no need for the drive gear to have a shape corresponding to the washer group, whereby the manufacturing process can be facilitated, and the time it takes to manufacture the fishing reel can be reduced.

2. Description of the Related Art

A conventional technique of a fishing reel having a function of braking unwinding rotation of a spool was proposed in Korean Patent Registration No. 10-1193910, entitled "Fishing Reel Having Means for Generating Click Sound".

The fishing reel according to this conventional technique includes a drive gear interlocked with a spool, around which a fishing line is wound, and a means for generating a click sound using different kinds of washers arranged on a central shaft for the drive gear.

In this conventional technique, by virtue of the click sound generating means, the manufacture and assembly can be facilitated while minimizing a change in the structure of the existing fishing reel, and the production cost competitiveness can be improved.

Furthermore, to embody a basic brake function of the fishing reel to prevent the fishing line from being damaged, the fishing reel of Patent Reg. No. 10-1193910 has a structure including: the drive gear coupled to the central shaft; the spool connected to the drive gear and provided with the fishing line wound around the spool; a drive washer fitted over and interlocked with the central shaft; and an auxiliary washer fitted over the central shaft and provided with outer protrusions for interlocking with the drive gear.

As such, in the conventional technique, the brake function is embodied by the drive gear and the different kinds of washers arranged on the central shaft for the drive gear. However, a process of forming the drive gear to have a shape corresponding to that of the auxiliary washer for preventing relative rotation of the drive gear and the auxiliary washer is very complex and difficult to embody.

Typically, gear teeth are formed through a cutting process on the outer circumferential surface of the drive gear made of metal having high wear resistance and stiffness so as to provide the intended function of the drive gear. Given this, it is very difficult to form an uneven surface corresponding to the uneven surface shape of the drag washer on the inner circumferential surface of the drive gear. Therefore, there are problems in that the productivity is reduced, and the production cost is increased.

SUMMARY OF THE INVENTION

Accordingly, the present invention has been made keeping in mind the above problems occurring in the conventional art including Korean Patent Registration No. 10-1193910, entitled "Fishing reel having means for generating click sound".

An object of the present invention is to provide a fishing reel including: a drive unit that is mounted to a frame and includes a drive gear for rotating a spool around which a fishing line is wound; and a drag assembly that brakes the unwinding rotation of the spool, wherein a separate washer retainer is provided to embody a structure using the drag unit for preventing a fishing line from being excessively rapidly reeled out, unlike the conventional art in which an uneven surface structure is formed on an inner circumferential surface of the drive gear receiving therein a washer group that is a part of a drag assembly and includes a drag washer. Therefore, a process of machining the drive gear having high stiffness into a shape corresponding to the uneven surface structure of the drag washer is not required, whereby the productivity can be enhanced, the production cost competitiveness can improved, and the quality in braking the spool can also be ensured.

Another object of the present invention is to provide a fishing reel that is provided with a fastening means for reliably coupling the washer retainer to the drive gear without relative rotation between the washer retainer and the drive gear, wherein the fastening means can be embodied in a variety of ways and the washer retainer is a part of a drag unit and is made of a widely used and inexpensive soft material such as synthetic resin, aluminum, etc.

In order to accomplish the above object, the present invention provides a fishing reel, including: a frame; a spool mounted to the frame, with a fishing line wound around the spool; a drive unit that has a drive gear provided in the frame and connected to the spool and is provided with a drive shaft, and a handle connected to the drive shaft so that the drive gear can be rotated by the handle; and a drag unit that has a drag assembly installed in the frame and brakes the unwinding rotation of the spool, and an adjuster provided to adjust drag power of the drag assembly.

The drag assembly includes: a washer retainer that is coupled to and interlocked with the drive gear and has a sidewall; and a drag assembly that is fitted over the drive shaft and received in the washer retainer and has a brake washer.

The washer group of the drag assembly may include: a D washer having a non-circular center hole so that the D washer is coupled to and interlocked with a no-load rotation prevention part of the drive shaft; and a drag washer that is disposed on a side or each of both sides of the D washer and has a circular center hole.

The washer retainer may include on an inner circumferential surface of the sidewall thereof a first interlocking part for no-load rotation. The drag washer may include a second interlocking part having a shape corresponding to the first interlocking part.

The fishing reel may further include a fastening means for fastening the washer retainer to the drive gear to ensure the interlocking of the washer retainer with the drive gear.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
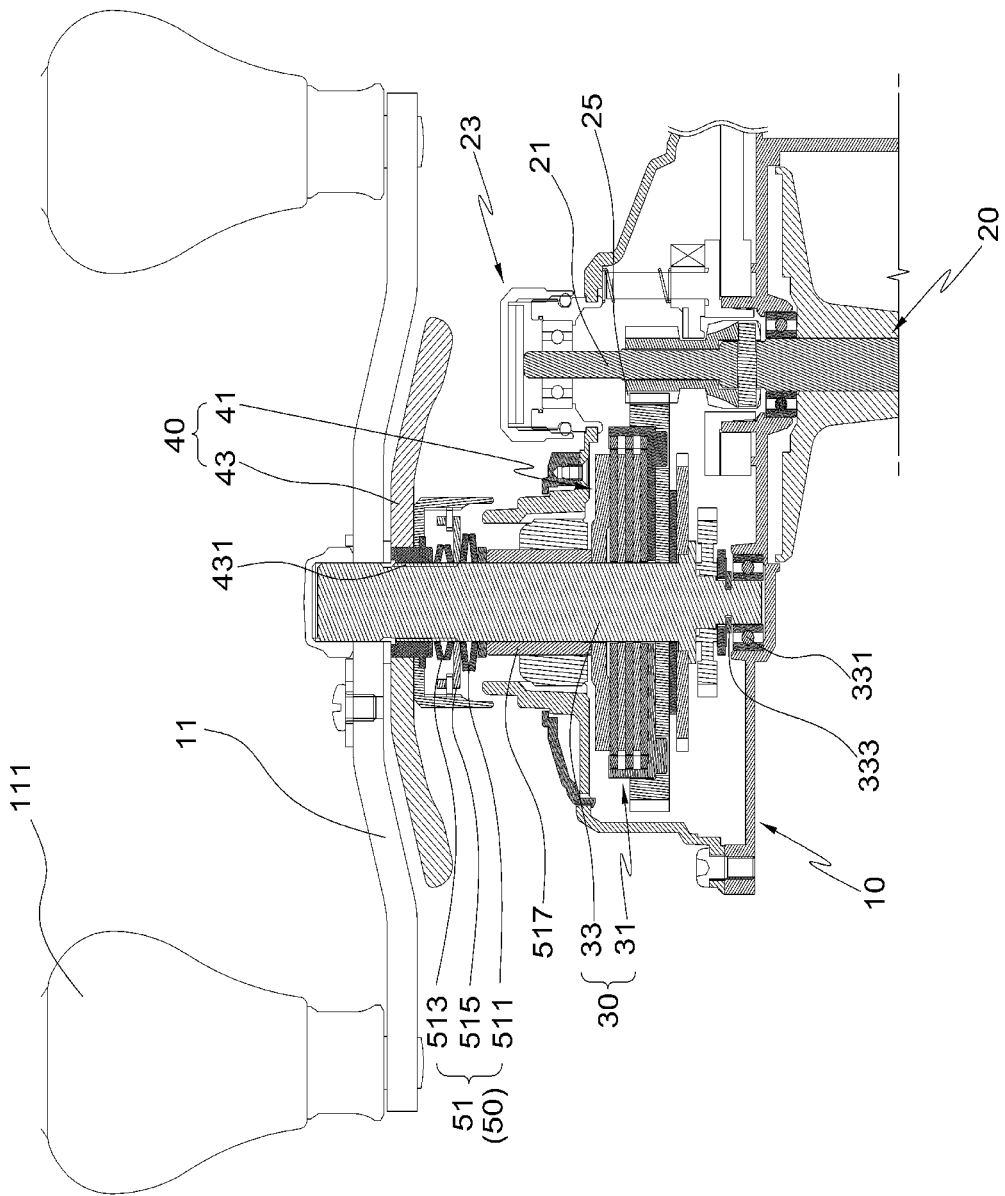
FIGS. 1 and 2 are partial sectional views illustrating a fishing reel according to an embodiment of the present invention.

Hereinafter, an exemplary embodiment of the present invention will be described in detail with reference to the attached drawings.

The present invention will now be described in detail based on aspects (or embodiments). The present invention may, however, be embodied in many different forms and should not be construed as being limited to only the embodiments set forth herein, but should be construed as covering modifications, equivalents or alternatives falling within ideas and technical scopes of the present invention.

In the figures, like reference numerals, particularly, tens and units, or reference numerals having like tens, units and letters refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise.

It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
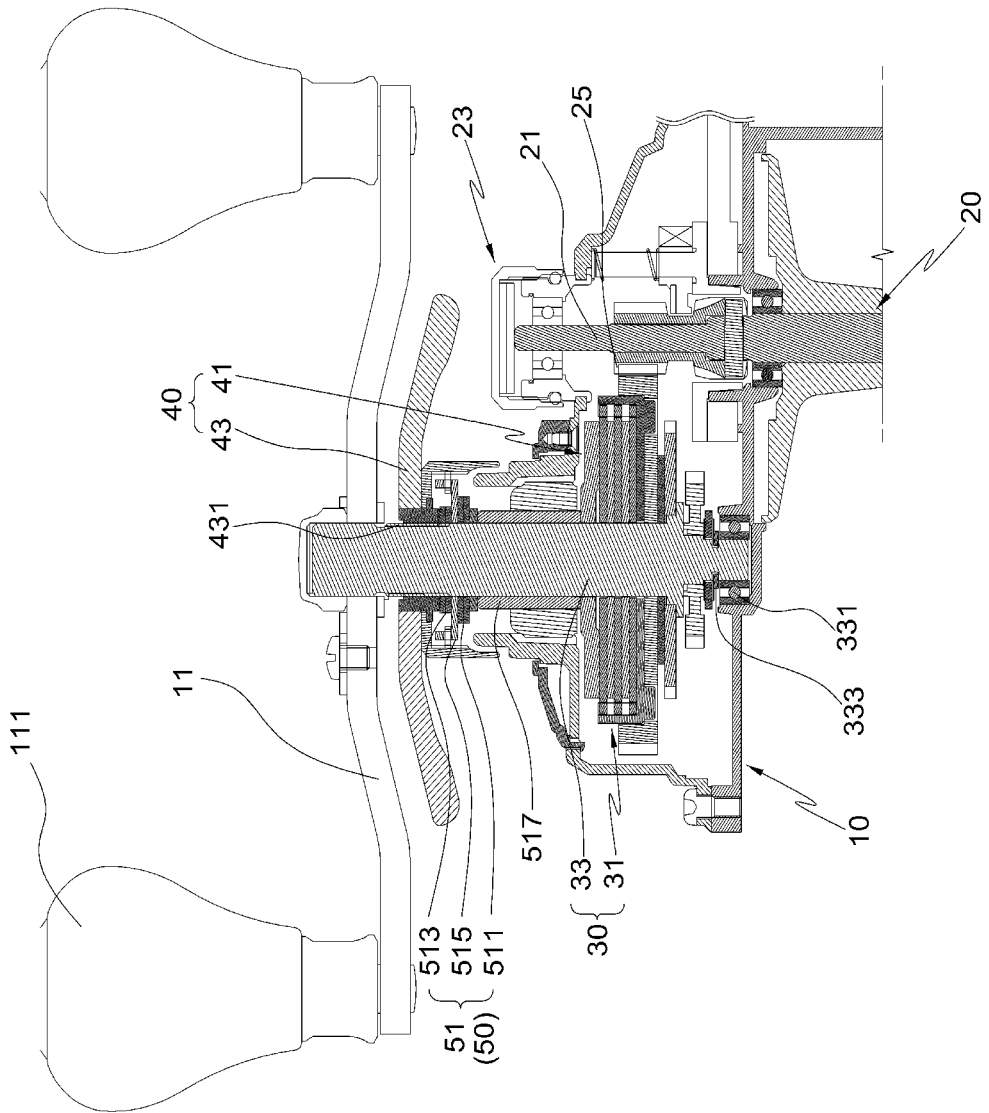

As shown in the partial sectional views of FIGS. 1 and 2, a fishing reel having a drag assembly 41 according to an exemplary embodiment of the present invention includes: a frame 10; a spool 20 that is mounted to the frame 10, and around which a fishing line is wound; a drive unit 30; and a drag unit 40.

In detail, the drive unit 30 includes a drive gear 31 and a handle 111.

The drive gear 31 is provided in the frame 10, is connected to the spool 20, and is provided with a drive shaft 33.

The handle 111 is connected to the drive shaft 33 so as to rotate the drive gear 31.

The drag unit 40 includes the drag assembly 41 that is installed in the frame 10 to brake the unwinding rotation of the spool 20, and an adjuster 43 provided to adjust drag power of the drag assembly 41.

In the same manner as a typical fishing reel, particularly, a typical bait reel, a coupling protrusion for coupling the fishing reel to a fishing rod is provided on the frame 10. In addition, the spool 20, the drive unit 30, the drag unit 40, etc., are mounted to the frame 10.

The fishing line is wound around the spool 20. The spool 20 is coupled to the frame 10 by a spool shaft 21. A tension nut 23 for use in adjusting the casting distance is disposed at the right side of the spool 20.

The drive unit 30 is provided to rotate the spool 20 and wind the fishing line around the spool 20. A pinion gear 25 of the spool 20 is rotated by rotation of the drive gear 31 provided in the frame 10. The handle 111 is coupled to an outer end of the drive shaft 33 over which the drive gear 31 is fitted. Preferably, the handle 111 is provided on each of the opposite ends of the handle bar 11 coupled to the end of the drive shaft 33. A user can operate the drive unit 30 using any one of the handles 111 provided on the respective opposite ends of the handle bar 11.

As needed, the drive unit 30 can be converted between left- and right-handed uses. The detailed description of the construction for the left- or right-handed use will be omitted. The direction of operation of the spool 20 is determined by conversion of the left- or right-handed use. The rotation of the spool 20 by means of the drive unit 30 is the operation of reeling in the fishing line.

An inner end of the drive shaft 33 is rotatably supported by a bearing 331 and is fastened to the frame 10 by a retaining means 333, particularly, including a snap ring. The bearing 331 is protected by a separate cover coupled to the frame 10 by a bolt.

The drive gear 31 having a circular center hole is coupled to the drive shaft 33.

Having a circular center hole, a washer retainer 411 of the drag unit 40 is coupled to the drive shaft 33 on the drive gear 31.

A washer group 413 is received in the washer retainer 411.

The drive shaft 33 has in an outer circumferential surface thereof a D- or U-cut section for preventing no-load rotation of, particularly, a D washer of the washer group.

An external threaded part is formed on the outer end of the drive shaft 33. The adjuster 43 for use in adjusting the frictional force of the drag unit 40, particularly, an adjuster that has a plurality of grip protrusions in a shape like a starfish and thus is typically called 'a star drag nut' in this art, is threaded over the external threaded part of the drive shaft 33.

As shown in FIG. 2, when the 'star drag nut'-type adjuster 43 is tightened and moved toward the drive gear 31, a compound spring washer unit 51 of an elastic means 50 is compressed.

This compressive force is transmitted to the washer group 413 by a bushing 517 so that the friction force of the washer group 413 is increased, whereby the drag power is increased.

Referring to FIG. 1 again, when the 'star drag nut'-type adjuster 43 is loosened and moved away from the drive gear 31, the compressive force that has been applied to the compound spring washer unit 51 of the elastic means 50 and to the washer group 413 is removed so that the friction force of the washer group 413 is reduced, whereby the drag power is reduced.

Furthermore, the handle bar 11 provided with the handle 111 on the opposite ends thereof is fitted over the outer end of the drive shaft 33 so that the drive shaft 33 can be rotated by the handle bar 11.

Referring to FIGS. 1 through 3 again, the drag assembly 41 of the fishing reel according to the present invention includes the washer retainer 411 and the washer group 413.

The washer retainer 411 is coupled to and interlocked with the drive gear 31 and has a sidewall 411A.

The washer group 413 is fitted over the drive shaft 33 and received in the washer retainer 411. Furthermore, the washer group 413 includes a drag washer 413B.

In more detail, the washer group 413 includes a D washer 413A and the drag washer 413B.

The D washer 413A has a non-circular hole 413Aa through which the D washer 413A is coupled to and interlocked with a no-load rotation prevention part of the drive shaft 33.

Here, the term 'D washer' is just a term that is representative of washers having a 'D'-shaped center hole or a 'U'-shaped center hole among non-circular center holes corresponding to the non-circular outer circumferential surface (for example: a D-cut or U-cut surface) of the no-load rotation prevention part of the drive shaft.

The drag washer 413B is disposed on one side or each of both sides of the D washer 413A and has a circular center hole 413Ba therein.

When rotated, the D washer 413A is always interlocked with the drive shaft 33. The D washer 413A is mainly made of stainless steel.

Providing frictional force, the drag washer 413B is made of material such as a carbon material having frictional characteristics and lubricant characteristics that are appropriately combined with each other.

In this embodiment of the fishing reel according to the present invention, the washer retainer 411 of the drag assembly 41 is coupled to the drive gear 31 in such a way that the washer retainer 411 is received in a receiving depression formed in a central portion of the drive gear 31. Except gear teeth 311 formed around the circumferential surface of the drive gear 31, the shape of the part of the drive gear 31 that makes contact with the washer retainer 411 or receives it therein may be changed in a variety of ways, as needed.

The drive gear 31 has on the circumferential outer surface thereof the gear teeth 311 that engage with the pinion gear 25. In an embodiment, the gear teeth 311 are formed on a drive gear having superior properties such as high abrasion resistance through a cutting process or the like.

In the case of the conventional technique, the complex protrusion-depression shape or the like of the inner circumferential surface of the washer retainer 411 is formed in the drive gear so as to provide the receiving depression for the washer group, particularly, the drag washer.

Unlike the conventional technique, in the present invention, the washer retainer 411 is easily manufactured through a manufacturing process, for example, injection molding or the like, using a soft and material such as synthetic resin or aluminum.

The washer group receiving depression having the complex shape is formed in the washer retainer.

Only a washer retainer fastening structure that can be easily made through a comparatively simple process is formed on the inner circumferential surface of the drive gear 31.

As such, in the present invention, the gear teeth 311 formed on the outer circumferential surface of the drive gear 31 engage with the pinion gear 25 so as to rotate the spool 20.

The receiving depression 313 is formed in the drive gear 31, and the washer retainer 411 is disposed in the receiving depression 313.

Disposed in the receiving depression 313, the washer retainer 411 includes the sidewall 411A that is provided with a first interlocking part 411B having a protrusion-depression structure corresponding to a protrusion-depression structure of the drag washer 413B.

Furthermore, a fastening means 315 is provided for fastening the washer retainer 411 to the drive gear 31 when the washer retainer 411 is received in the receiving depression 313. The fastening means 315 can be embodied in a variety of ways.

The first interlocking part 411B for preventing no-load rotation is formed on the inner circumferential surface of the sidewall 411A of the washer retainer 411. The drag washer 413B includes a second interlocking part 413Bb having a shape corresponding to that of the first interlocking part 411B.

Figure 3:
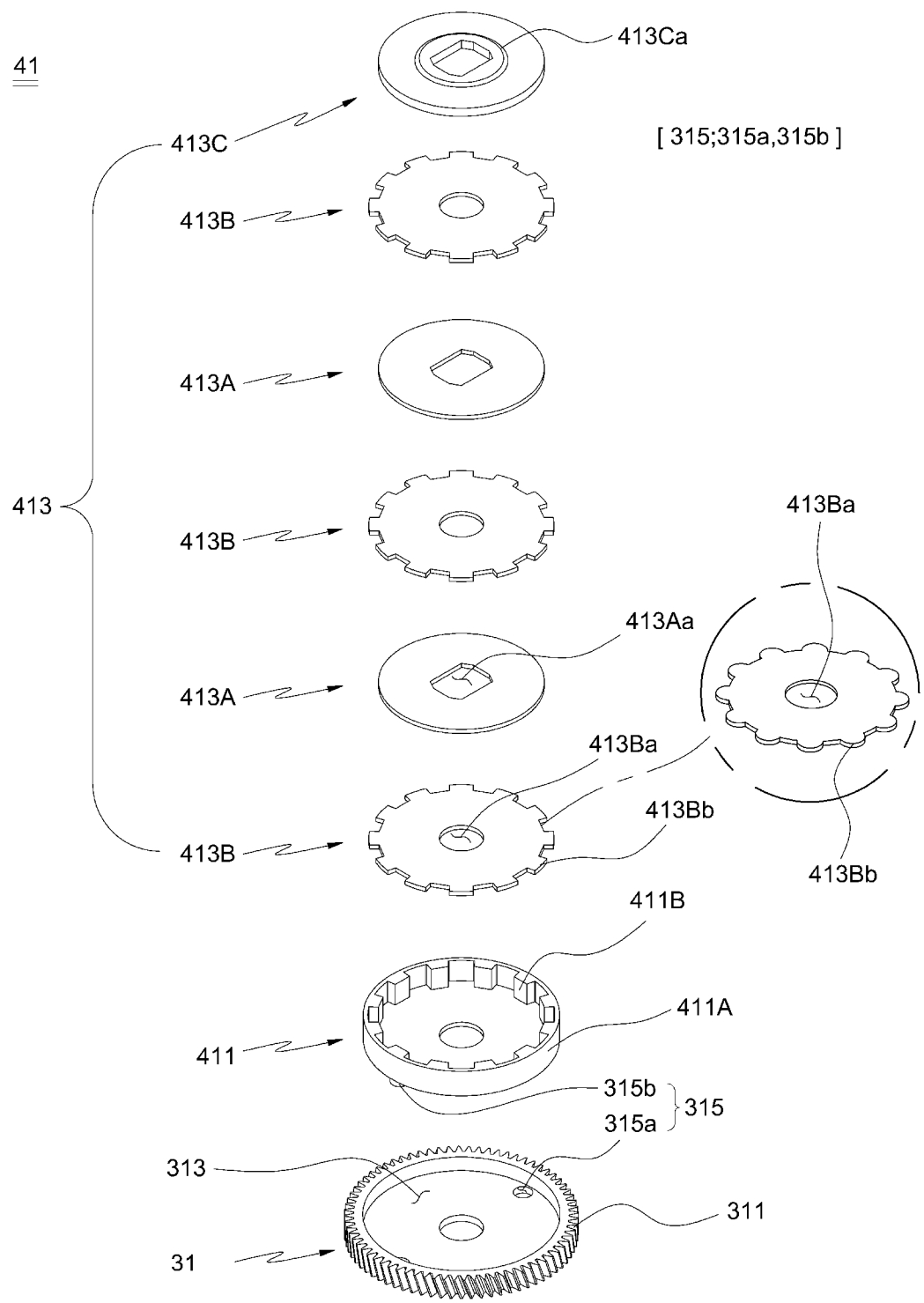
FIG. 3 is an perspective view of a drive gear and a drag assembly of the fishing reel according to the present invention.

Disposed in the washer retainer 411, the washer group 413 includes the drag washer 413B, the D washer 413A, the drag washer 413B, the D washer 413A, the drag washer 413B, and a cover washer 413C in a positional sequence starting from closest to the drive gear 31 as shown in the exploded view of FIG. 3.

The drag washer 413B has a circular center hole 413Ba and the second interlocking part 413Bb that corresponds to the first interlocking part 411B formed on the inner surface of the sidewall 411A of the washer retainer 411. Thus, when the washer retainer 411 rotates, the drag washer 413B is rotated interlocking with the washer retainer 411.

The D washer 413A has the non-circular center hole 413Aa corresponding to the non-circularly formed part of the drive shaft that is the no-load rotation prevention part having, for example, a non-circular D-cut shape.

When the fishing line is reeled out by a fish hooked to a fishing hook, the rotation of the spool 20 is transmitted to the drive gear 31 via the pinion gear 25 so that the drive gear 31 is rotated. When the drive gear 31 is rotated, the drive shaft 33 does not rotate along with the drag washer 413B. In this way, the frictional braking function is conducted.

The cover washer 413C has a non-circular center hole 413Aa, for example, having a D-cut shape. Therefore, the cover washer 413C is rotated along with the drive shaft 33. A compression protrusion 413Ca is provided on an outer surface of the cover washer 413C. The bushing 517 comes into close contact with the compression protrusion 413Ca. Here, the bushing 517 is a drum-shaped medium provided for transmitting the compressing force, in other words, the drag power, of the elastic means 50 of the drag unit 40. By virtue of the compression protrusion 413Ca and the bushing 517, force can be more reliably transmitted from the elastic means 50 to the cover washer 413C.

As stated above, FIG. 1 illustrates conditions in which spring washers 511 and 513 are not compressed by the adjuster 43, and FIG. 2 illustrates conditions in which the spring washers 511 and 513 are compressed by the adjuster 43.

The elastic means 50 for elastically transmitting compression force to the washer group 413 depending on forward or backward movement of the adjuster 43 is provided on the drive shaft 33. The bushing 517 having a drum shape is interposed between the washer group 413 and the spring washers 511 and 513 so that the force of the spring washers 511 and 513 can be transmitted to the washer group 413 without being impeded by the inner side surface of the hollow space of the frame 10.

In this embodiment, the compound spring washer unit 51 is used as the elastic means 50 and is disposed in contact with the bushing 517. The compound spring washer unit 51 includes a high-elastic spring washer 511, particularly, in this embodiment, a set of two high-elastic spring washers 511.

The compound spring washer unit 51 further includes a separation body 515 disposed on the high-elastic spring washers 511, and a set of two low-elastic spring washers 513 successively disposed on the separation body 515.

With regard to rotating and moving forward or backward the adjuster 43 of the drag unit for adjusting the drag power of the fishing reel and transmitting the degree of the forward or backward movement of the adjuster 43 to parts such as the drive gear 31 connected to the spool 20 through the washer group 413, the terms 'high-elasticity' and 'low-elasticity', which are relative notions, fall within the bounds in which the spring washers can be elastically deformed or returned by rotating the adjuster 43 using human power according to the common technical knowledge of those skilled in the fishing reel industry.

Basically, two or more spring washers having different elasticities are provided between the adjuster 43 and the washer group 413.

The adjuster 43 having a threaded part 431 is coupled to the drive shaft 33 so that the adjuster 43 can be moved forward or backward along the drive shaft 33 when adjuster 43 is rotated.

In this embodiment, the adjuster 43 is threadedly coupled to the drive shaft 33. Alternatively, in the scope and spirit of the invention, the adjuster 43 may be coupled to an external threaded part (or an internal threaded part) of the other parts including the frame 10, etc. such that the adjuster 43 can be rotated and moved forward or backward.

Therefore, in the accompanying claims, an element having a threaded structure that is threadedly coupled to the threaded part 431 of the adjuster 43 is not specified to a special element.

The separation body 515 functions to make the elastic forces of both the spring washers, particularly, the two sets of spring washers, be more reliably applied to the washer group 413 so that the drag power (braking power) can be constantly and proportionally increased.

Furthermore, the separation body 515 includes a click holder having a receiving depression in an outer portion thereof. One of the spring washers, preferably, the low-elastic spring washer 513, more particularly, the set of low-elastic spring washers 513, is disposed in the receiving depression so as to embody a compact structure corresponding to the characteristics of the frame 10 of the fishing reel having a confined installation space.

FIGS. 3 through 6 are exploded perspective views and assembled sectional views showing various embodiments of the above-mentioned fastening means 315. The fastening means 315 can include various structures rather than a single element for maintaining the coupling of the washer retainer 411 to the drive gear 31.

In the case where the washer retainer 411 is received in the drive gear 31, the fastening means 315 is provided to interlock the drive gear 31 with the washer retainer 411.

First, FIG. 3 illustrates a first embodiment of the fastening means 315. One or more fastening holes 315a are formed in the drive gear 31. One or more fastening protrusions 315b corresponding to the respective fastening holes 315a are provided under a lower surface of the washer retainer 411. Thus, when the washer retainer 411 is received into the drive gear 31, the fastening protrusions 315b are inserted into the respective fastening holes 315a, thus preventing the washer retainer 411 from rotating relative to the drive gear 31.

FIG. 3 illustrates a second embodiment of the fastening means 315. The washer retainer 411 including the sidewall 411A has an annular shape.

The fastening means 315 includes a plurality of fastening screw holes 315c, a plurality of second fastening screw holes 315d, and fastening screws 315e.

The fastening screw holes 315c are formed in the lower surface of the washer retainer 411.

The second fastening screw holes 315d are formed in the drive gear 31 at positions corresponding to the first fastening screw holes 315c.

Figure 4:
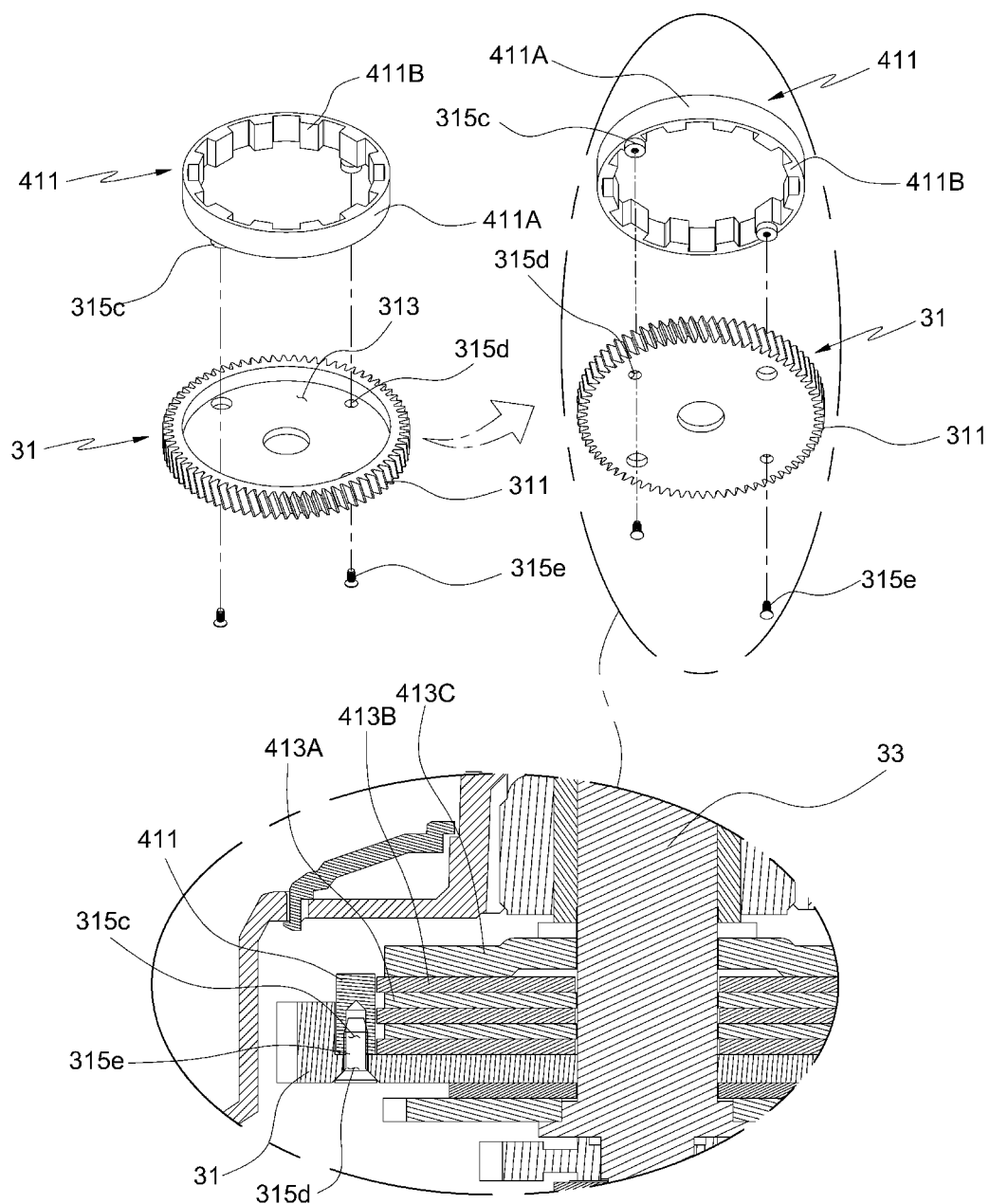
FIGS. 4 through 6 are views showing several embodiments of a fastener for coupling a washer retainer to the drive gear according to the present invention.

The fastening screws 315e are tightened into the first and second fastening screw holes 315c and 315d upward based on the orientation shown in FIG. 4, whereby the washer retainer 411 can be fastened to and interlocked with the drive gear 31.

Figure 5:
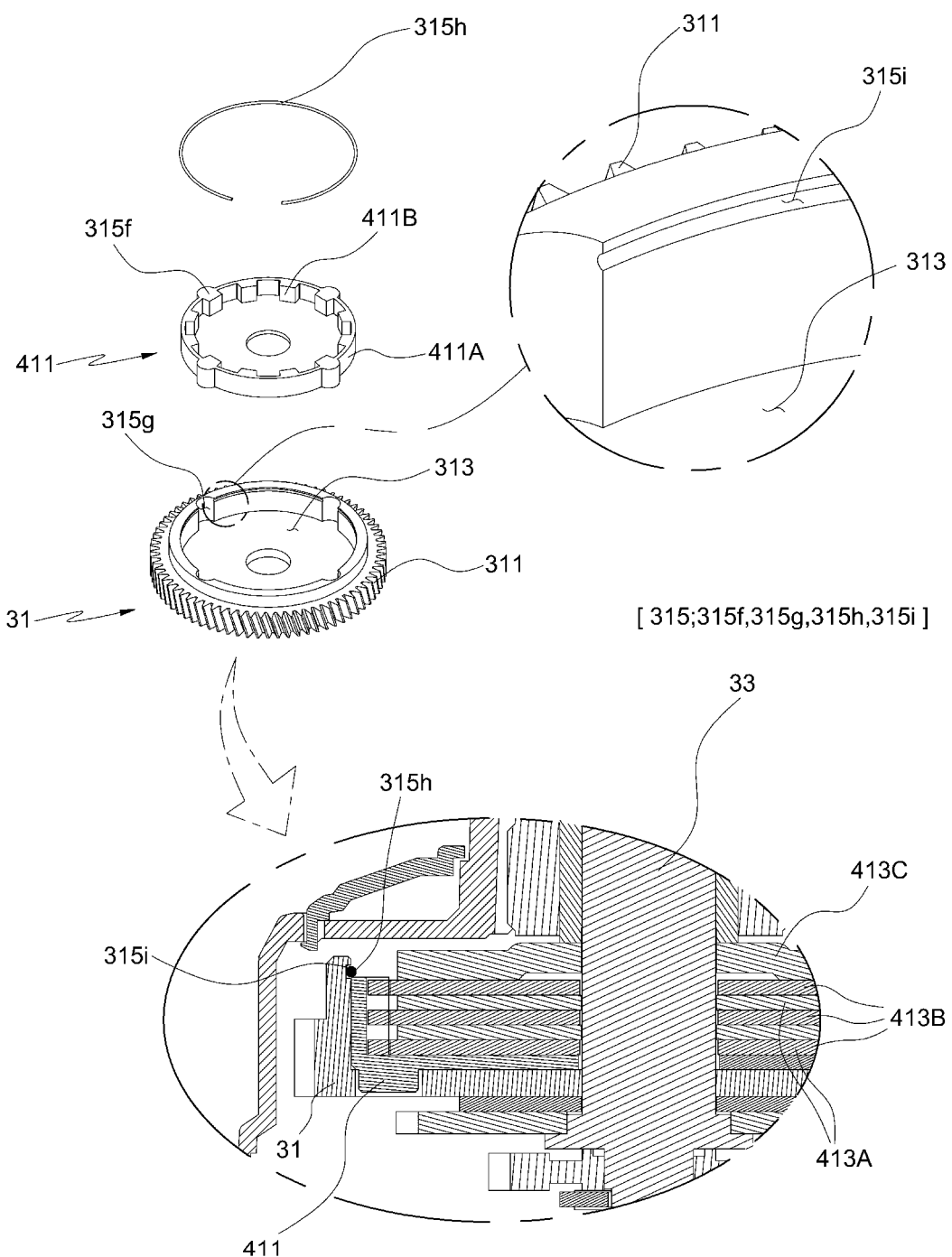

FIG. 5 illustrates a third embodiment of the fastening means 315.

The fastening means 315 includes a plurality of protrusions 315f that protrude outward from the sidewall 411A of the washer retainer 411, and a plurality of fastening recesses 315g that are formed in the sidewall 411A of the receiving depression 313 of the drive gear 31 at positions corresponding to the respective protrusions 315f.

Although each protrusion 315f has been illustrated as having a semicircular shape in the drawing, it may have other shapes, for example, a rectangular shape, a pentagonal shape, etc. The bounds of the present invention should not be limited by this.

When the washer retainer 411 is inserted into the drive gear 31, the respective protrusions 315f are coupled to the respective fastening recesses 315g, whereby the washer retainer 411 and the drive gear 31 can be interlocked with each other and rotated together.

To prevent the washer retainer 411 from being removed from the drive gear 31 while they are rotated, it is preferable that the fastening means 315 further include an annular elastic body 315h that is open on a portion thereof.

Furthermore, to install the elastic body 315h in the drive gear 31, an annular groove 315i extending in the circumferential direction is formed in an upper portion of the inner side surface of the drive gear (based on the orientation shown in FIG. 5) so that the elastic body 315h is disposed in the annular groove 315i.

In this case, the washer retainer 411 is inserted into the receiving depression 313 of the drive gear 31.

Thereafter, the elastic body 315h is contracted by applying force thereto and then inserted into the annular groove 315i above the washer retainer 411. Subsequently, when the elastic body 315h is released, it is fitted into the annular groove 315i by the elastic force thereof.

The annular groove 315i receives a portion of the elastic body 315h. The other portion of the elastic body 315h that is not received in the annular groove 315i compresses the upper end of the sidewall 411A of the washer retainer 411, thus preventing the washer retainer 411 from being undesirably removed from the drive gear 31.

Figure 6:
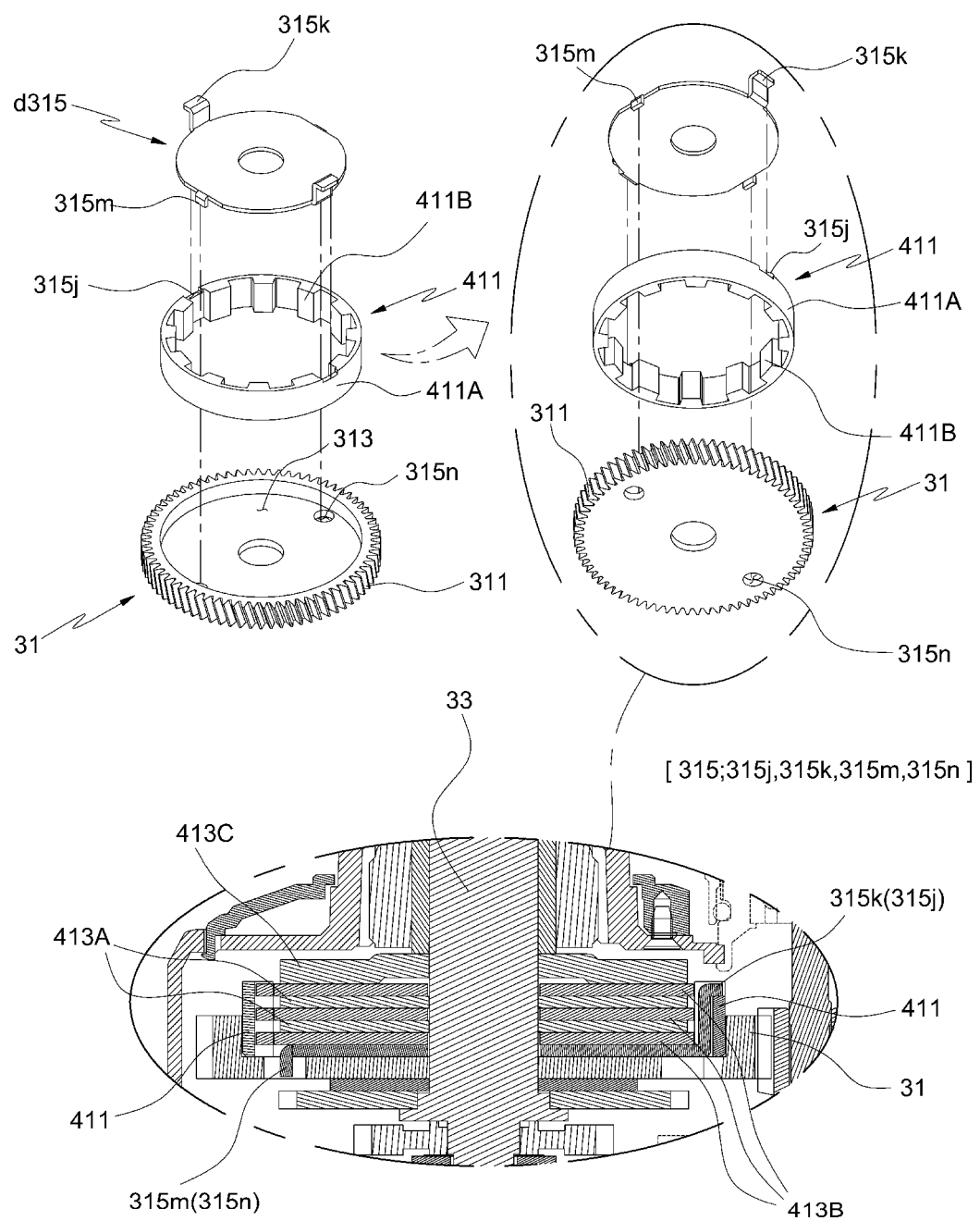

FIG. 6 illustrates a fourth embodiment of the fastening means 315.

In the same manner as the second embodiment, the washer retainer 411 includes only the sidewall 411A and thus has an annular shape.

In detail, the fastening means 315 for fastening the washer retainer 411 to the drive gear 31 further includes an auxiliary fastening disk d315. A plurality of coupling holes 315j is formed in the washer retainer 411.

Fastening clips 315k corresponding to the respective coupling holes 315j protrude from the auxiliary fastening disk d315.

The auxiliary fastening disk d315 can be reliably fastened to the washer retainer 411 by the coupling of the fastening clips 315k to the corresponding coupling holes 315j.

A plurality of interlocking protrusions 315m is provided on a lower surface of the auxiliary fastening disk d315.

Furthermore, interlocking holes 315n are formed in the drive gear 31. The interlocking protrusions 315m are coupled to the respective interlocking holes 315n so that the auxiliary fastening disk d315 coupled to the washer retainer 411 is interlocked with and rotated along with the drive gear 31.

Therefore, the washer retainer 411 coupled to the fastening means 315 can be interlocked with and rotated along with the drive gear 31.

As described above, a fishing reel according to the present invention includes a drive unit having a drive gear, and a drag unit having a drag assembly for braking an unwinding rotation of a spool. The fishing reel according to the present invention can prevent a fishing line from being excessively rapidly unwound and from snapping.

Furthermore, the drag assembly includes a washer retainer coupled to the drive gear, and a washer group received in the washer retainer. Therefore, there is no need for the drive gear to have a shape corresponding to the washer group, whereby difficulties in the manufacturing process can be solved, and the time it takes to manufacture the fishing reel can be reduced.

Moreover, the washer group according to the present invention includes a D washer having a non-circular center hole, and a drag washer having a circular center hole. Therefore, the degree of no-load rotation of the drag washer relative to the drive shaft can be adjusted by controlling the frictional force between the D washer and the drag washer, whereby the speed at which the fishing line is unwound can be controlled.

In addition, the present invention includes a separate fastening means for coupling the washer retainer to the drive gear. Thereby, a process of assembling the water retainer with the drive gear can be facilitated, and the washer retainer and the drive gear can be reliably maintained in the assembled state.

Although embodiments of a fishing reel having a drag assembly according to the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fishing reel, comprising:
  a frame;
  a spool mounted to the frame, with a fishing line wound around the spool;
  a drive unit comprising:
    a drive gear provided in the frame and connected to the spool, the drive gear being provided with a drive shaft; and
    a handle connected to the drive shaft so that the drive gear can be rotated by the handle; and
  a drag unit comprising:
    a drag assembly installed in the frame, the drag assembly braking unwinding rotation of the spool; and
    an adjuster provided to adjust drag power of the drag assembly,
  wherein the drag assembly comprises:
  a washer retainer coupled to and interlocked with the drive gear, the washer retainer including a sidewall;
  a washer group fitted over the drive shaft and received in the washer retainer, the drag assembly including a brake washer; and
  a fastening means for fastening the washer retainer to the drive gear to ensure the interlocking of the washer retainer with the drive gear,
  wherein the fastening means comprises: a coupling hole formed in the washer retainer; an interlocking hole formed in the drive gear; and an auxillary fastening disk provided both with a fastening clip coupled to the coupling hole and with an interlocking protrusion coupled to the interlocking hole.

2. The fishing reel as set forth in claim 1, wherein the washer group of the drag assembly comprises:
  a D washer having a non-circular center hole so that the D washer is coupled to and interlocked with a no-load rotation prevention part of the drive shaft; and
  a drag washer disposed on a side or each of both sides of the D washer, the drag washer having a circular center hole,
  the washer retainer includes on an inner circumferential surface of the sidewall thereof a first interlocking part for no-load rotation, and
  the drag washer includes a second interlocking part having a shape corresponding to the first interlocking part.

* * * * *